(12) United States Patent
Carrubba

(10) Patent No.: US 9,394,698 B2
(45) Date of Patent: Jul. 19, 2016

(54) DECK SYSTEM AND COMPONENTS

(75) Inventor: Vincent Frank Carrubba, Baldwin, NY (US)

(73) Assignee: Admiral Composite Technologies, Inc., Baldwin, NY (US)

( * ) Notice: Subject to any disclaimer, the term of this patent is extended or adjusted under 35 U.S.C. 154(b) by 135 days.

(21) Appl. No.: 13/465,512

(22) Filed: May 7, 2012

(65) Prior Publication Data

US 2013/0219806 A1    Aug. 29, 2013

Related U.S. Application Data

(60) Provisional application No. 61/602,346, filed on Feb. 23, 2012.

(51) Int. Cl.
*E04F 15/02* (2006.01)
*F24D 3/12* (2006.01)
(Continued)

(52) U.S. Cl.
CPC ..... *E04F 15/02033* (2013.01); *E04F 15/02038* (2013.01); *E04F 15/102* (2013.01); *E04F 15/105* (2013.01); *E04F 15/107* (2013.01); *E04F 17/00* (2013.01); *F24D 3/127* (2013.01); *E04F 2201/0153* (2013.01); *E04F 2203/04* (2013.01); *E04F 2290/023* (2013.01)

(58) Field of Classification Search
CPC .............. E04F 15/02; E04F 2201/0115; E04F 2201/023; E04F 2201/026; E04F 15/10; E04F 15/02038; E04F 13/0814; E04F 13/0826; E04F 13/0894

USPC ........... 52/220.1, 220.2, 588.1, 582.1, 586.1, 52/591.1, 591.4
See application file for complete search history.

(56) References Cited

U.S. PATENT DOCUMENTS

| | | |
|---|---|---|
| 2,004,193 A | 6/1935 | Cherry |
| 5,004,895 A | 4/1991 | Nishino et al. |
| 5,048,248 A | 9/1991 | Ting |

(Continued)

FOREIGN PATENT DOCUMENTS

| | | |
|---|---|---|
| EP | 0786496 | 7/1997 |
| EP | 1692981 A1 | 8/2006 |

(Continued)

OTHER PUBLICATIONS

Eg. Abstract Bettini et al. "Investigation on the Use of Coir Fiber as Alternative Reinforcement in Polypropylene" Journal of Applied Polymer Science, 2010, 118(5), 2841-2848.

(Continued)

*Primary Examiner* — Brian Glessner
*Assistant Examiner* — Adam Barlow
(74) *Attorney, Agent, or Firm* — Kramer & Amado, P.C.

(57) ABSTRACT

A decking system is made up of a variety of decking boards and other components are disclosed. In some aspects, the decking boards are connectable to each other so that adjacent boards will provide a water barrier and a drainage channel. Some versions of the boards may have a hollow region to accept the provision of heating elements or other accessory structures. A connector piece is disclosed in various embodiments span the gap between the butt ends of the boards to provide a water barrier at the butt ends of the boards. A gutter and downspout system is disclosed, as well as structures for protecting the ends or sides of the deck structure.

18 Claims, 22 Drawing Sheets

(51) Int. Cl.
*E04F 15/10* (2006.01)
*E04F 17/00* (2006.01)

(56) References Cited

U.S. PATENT DOCUMENTS

| | | |
|---|---|---|
| 5,050,362 A | 9/1991 | Tal et al. |
| 5,274,979 A * | 1/1994 | Tsai ................ E04C 2/292 |
| | | 52/588.1 |
| 5,527,128 A | 6/1996 | Rope et al. |
| 5,660,016 A | 8/1997 | Erwin et al. |
| 5,694,730 A | 12/1997 | Del Rincon et al. |
| 5,740,858 A | 4/1998 | Ingram et al. |
| 5,758,467 A | 6/1998 | Snear et al. |
| 5,816,010 A | 10/1998 | Conn |
| 5,850,720 A | 12/1998 | Willis |
| 5,862,854 A | 1/1999 | Gary |
| 6,092,587 A | 7/2000 | Ingram et al. |
| 6,324,796 B1 | 12/2001 | Heath |
| 6,438,919 B1 * | 8/2002 | Knauseder ............ E04B 9/26 |
| | | 52/582.2 |
| 6,484,467 B2 | 11/2002 | Crout |
| 6,490,838 B2 | 12/2002 | Summerford |
| 6,614,992 B2 | 9/2003 | Schmitt |
| 6,647,690 B1 * | 11/2003 | Martensson ........ E04F 15/02 |
| | | 52/489.1 |
| D492,797 S | 7/2004 | Simko et al. |
| 6,918,221 B2 | 7/2005 | Williams |
| 6,986,934 B2 | 1/2006 | Chen et al. |
| 7,021,012 B2 | 4/2006 | Zeng et al. |
| 7,021,019 B2 | 4/2006 | Knauseder |
| 7,047,697 B1 | 5/2006 | Heath |
| 7,073,303 B2 | 7/2006 | Baker |
| 7,131,242 B2 * | 11/2006 | Martensson ......... E04B 1/6129 |
| | | 52/578 |
| 7,188,456 B2 | 3/2007 | Knauseder |
| 7,380,383 B2 | 6/2008 | Olofsson et al. |
| 7,406,801 B2 | 8/2008 | Zeng et al. |
| 7,415,801 B2 | 8/2008 | Zeng et al. |
| RE41,140 E | 2/2010 | Heath |
| 7,748,176 B2 | 7/2010 | Harding et al. |
| 7,793,470 B1 | 9/2010 | Mathiesen et al. |
| 7,861,483 B2 | 1/2011 | Dammers |
| 7,908,812 B2 | 3/2011 | Eberle, III |
| 7,926,239 B2 | 4/2011 | Hahn et al. |
| 7,926,557 B2 | 4/2011 | Huebner et al. |
| 7,941,989 B2 | 5/2011 | Morsching |
| 8,621,814 B2 | 1/2014 | Cappelle |
| 8,793,956 B2 | 8/2014 | Leopolder et al. |
| 8,938,929 B2 | 1/2015 | Engstrom |
| 2002/0040557 A1 | 4/2002 | Felton |
| 2002/0100242 A1 * | 8/2002 | Olofsson ............ E04F 13/16 |
| | | 52/588.1 |
| 2002/0170259 A1 | 11/2002 | Ferris |
| 2002/0178681 A1 * | 12/2002 | Zancai ............... E04F 15/02 |
| | | 52/592.1 |
| 2004/0031227 A1 | 2/2004 | Knauseder |
| 2006/0174577 A1 | 8/2006 | O'Neil |
| 2006/0191232 A1 | 8/2006 | Salazar et al. |
| 2006/0251851 A1 | 11/2006 | Bowman |
| 2007/0028547 A1 | 2/2007 | Grafenauer |
| 2007/0240374 A1 | 10/2007 | Bennett et al. |
| 2007/0240375 A1 | 10/2007 | Bennett et al. |
| 2008/0282638 A1 | 11/2008 | Douglass |
| 2009/0014152 A1 | 1/2009 | Foo et al. |
| 2009/0217615 A1 | 9/2009 | Engstrom |
| 2009/0260313 A1 | 10/2009 | Segaert |
| 2010/0056699 A1 | 3/2010 | Dobashi et al. |
| 2010/0089899 A1 | 4/2010 | Dohring et al. |
| 2010/0269435 A1 | 10/2010 | Hanya |
| 2010/0319293 A1 | 12/2010 | Dammers |
| 2011/0173914 A1 | 7/2011 | Engstrom |
| 2011/0252737 A1 | 10/2011 | Boyer |
| 2011/0277406 A1 * | 11/2011 | Kang ................ E04F 15/22 |
| | | 52/309.3 |
| 2012/0055112 A1 | 3/2012 | Engstrom |
| 2012/0124932 A1 | 5/2012 | Schulte |
| 2012/0180416 A1 * | 7/2012 | Perra ................ E04F 15/02 |
| | | 52/309.1 |
| 2013/0111837 A1 | 5/2013 | Devos |
| 2013/0219806 A1 | 8/2013 | Carrubba |
| 2014/0366475 A1 | 12/2014 | Cappelle |

FOREIGN PATENT DOCUMENTS

| | | |
|---|---|---|
| KR | 1020090109025 | 10/2009 |
| KR | 20110092496 A | 8/2011 |
| WO | 2004053257 A1 | 6/2004 |
| WO | 2006052967 | 5/2006 |
| WO | 2006059339 | 6/2006 |
| WO | 2007020749 A1 | 2/2007 |

OTHER PUBLICATIONS

Eg. Abstract Enriquez et al. "Fabrication and Characterization of High-Density Polyethylene-Coconut Coir Composites with Stearic Acid as Compatibilizer" Journal of Thermoplastic Composite Materials, 2010, 23(3), 361-373.
Eg. Abstract Gu. "Tensile Behaviours of the Coir Fibre and Related Composites After NaOH Treatment" Materials & Design, 2009, 30(9), 3931-3934.
Eg. Abstract Haque et al. "Physico-Mechanical Properties of Chemically Treated Palm and Coir Fiber Reinforced Polypropylene Composites" Bioresource Technology, 2009, 100(20), 4903-4906.
Eg. Abstract Islam et al. "Physico-Mechanical Properties of Chemically Treated Coir Reinforced Polypropylene Composites" Composites Part A, 2010, 41(2), 192-198.
Eg. Abstract Islam et al. "Mechanical and Morphological Properties of Chemically Treated Coir-Filled Polypropylene Composites" Ind. Eng. Chem. Res., 2009, 48(23), 10491-10497.
Eg. Abstract Lai et al. "Mechanical and Electrical Properties of Coconut Coir Fiber-Reinforced Polypropylene Composites" Polymer-Plastics Technology and Engineering, 2005, 44(4), 619-634.
Eg. Abstract Sharma et al. "Studies on the Weathering Behavior of Glass Coir Polypropylene Composites" Journal of Reinforced Plastics and Composites, 2009, 28, 2605-2613.
Eg. Abstract Tan et al. "Effect of Alkali Treatment of Coir Fiber on its Morphology and Performance of the Fiber/LLDPE Bio-Composites," Advanced Materials Resarch, 2010, 139-141, 348.
Eg. Abstract Tan et al. "Effect of Interface Improving on Morphology and Properties of Coir Fiber/LLDPE Bio-Composites," Advanced Materials Resarch, 2011, 217-218, 1245.
International Search Report for PCT/US2013/027311, Dated Sep. 10, 2013.
"Non-final Rejection for U.S. Appl. No. 14/276,402 dated Mar. 31, 2015".
EP Communication and Search Report for EP Appln.No. 15167391 dated Dec. 9, 2015.
Office Action mailed Apr. 1, 2016 in U.S. Appl. No. 14/704,466.

* cited by examiner

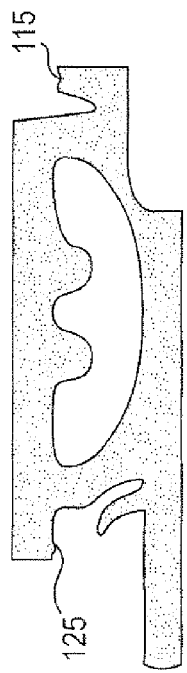
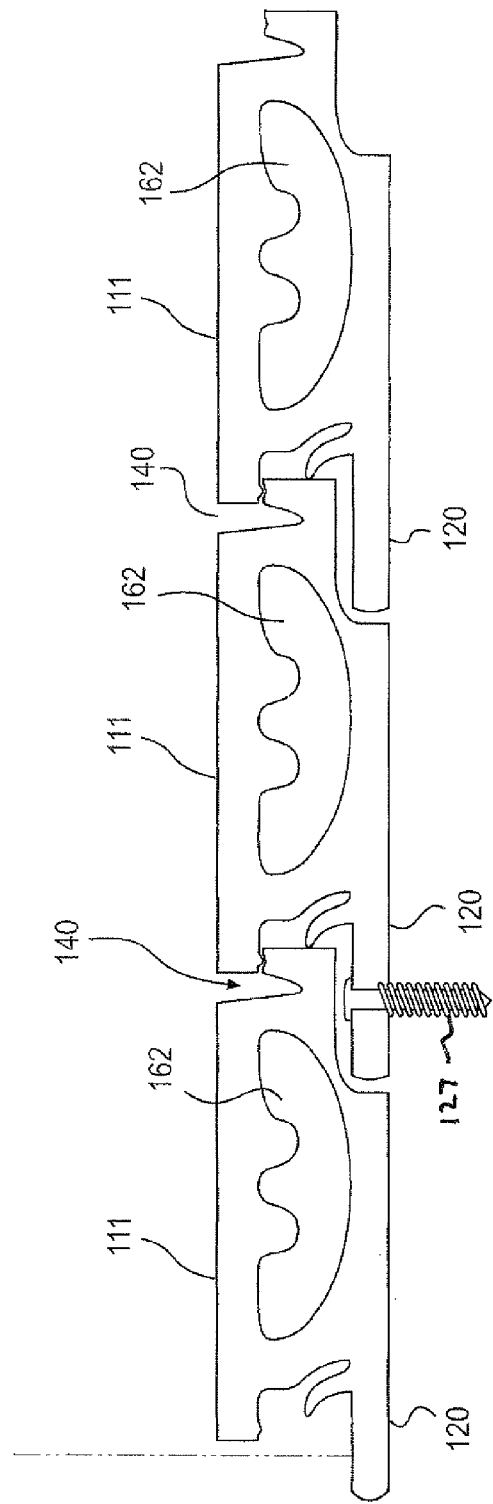

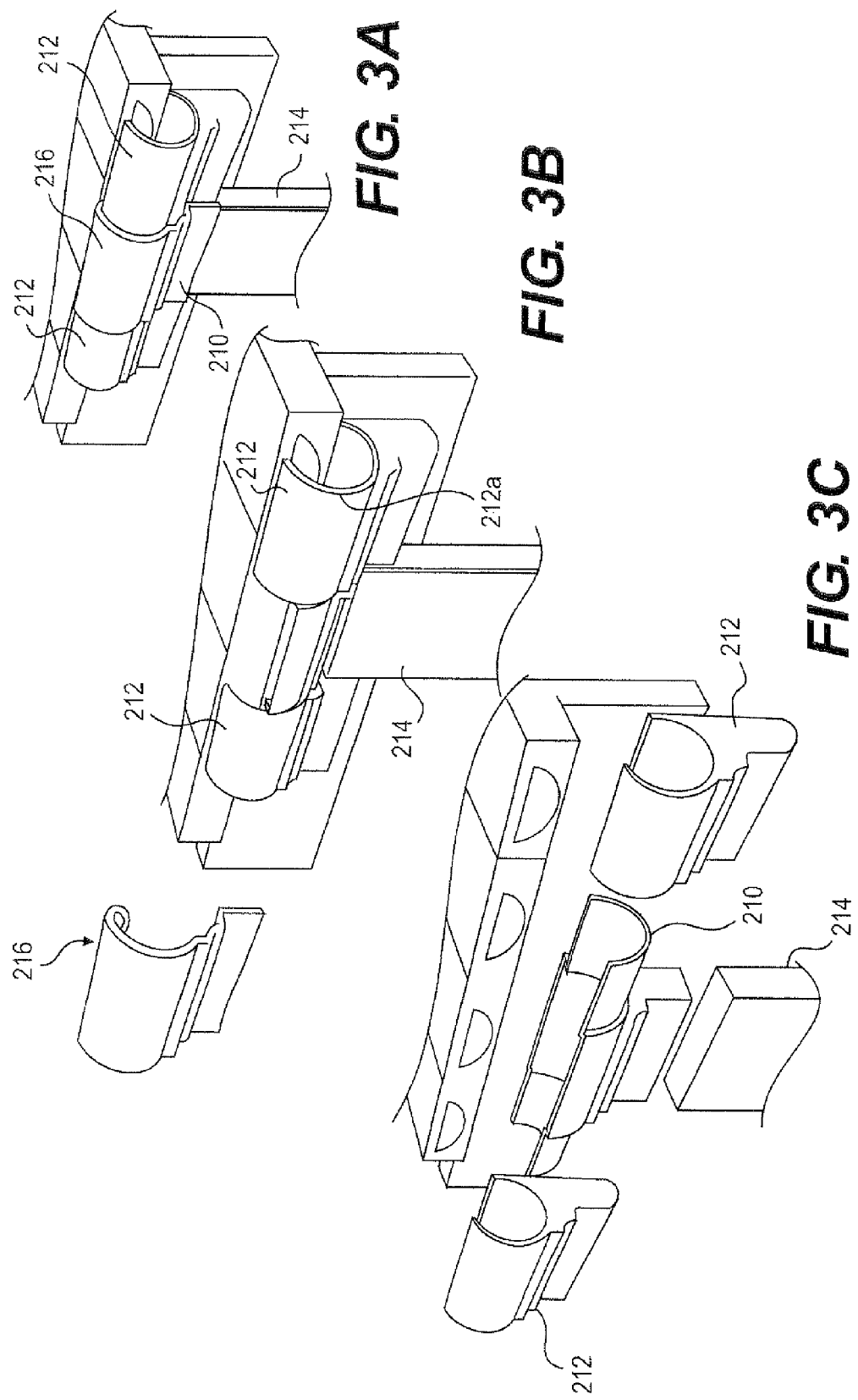

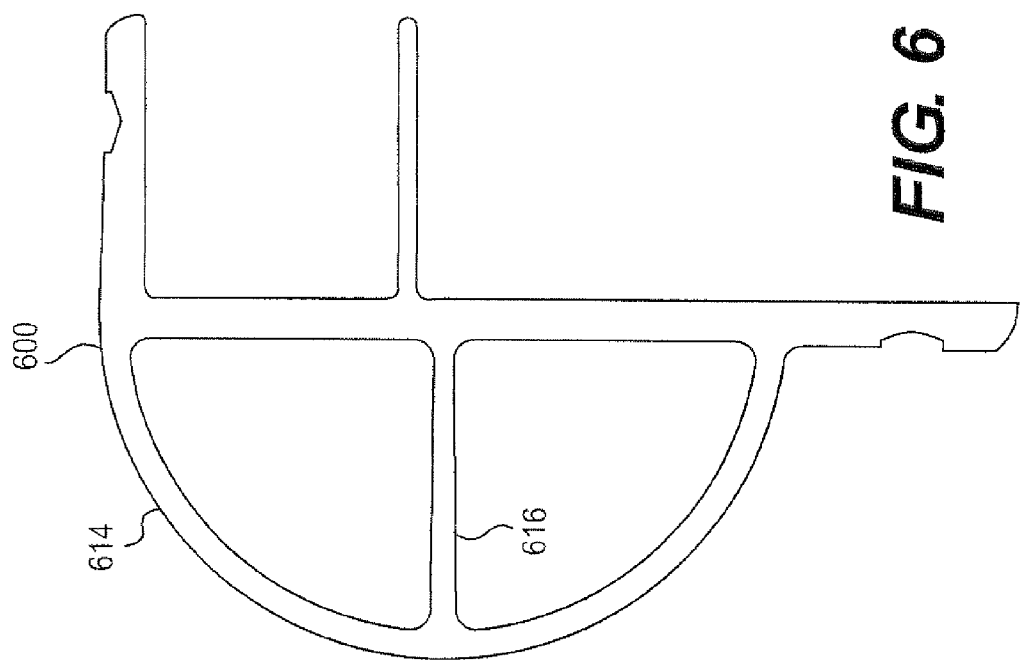

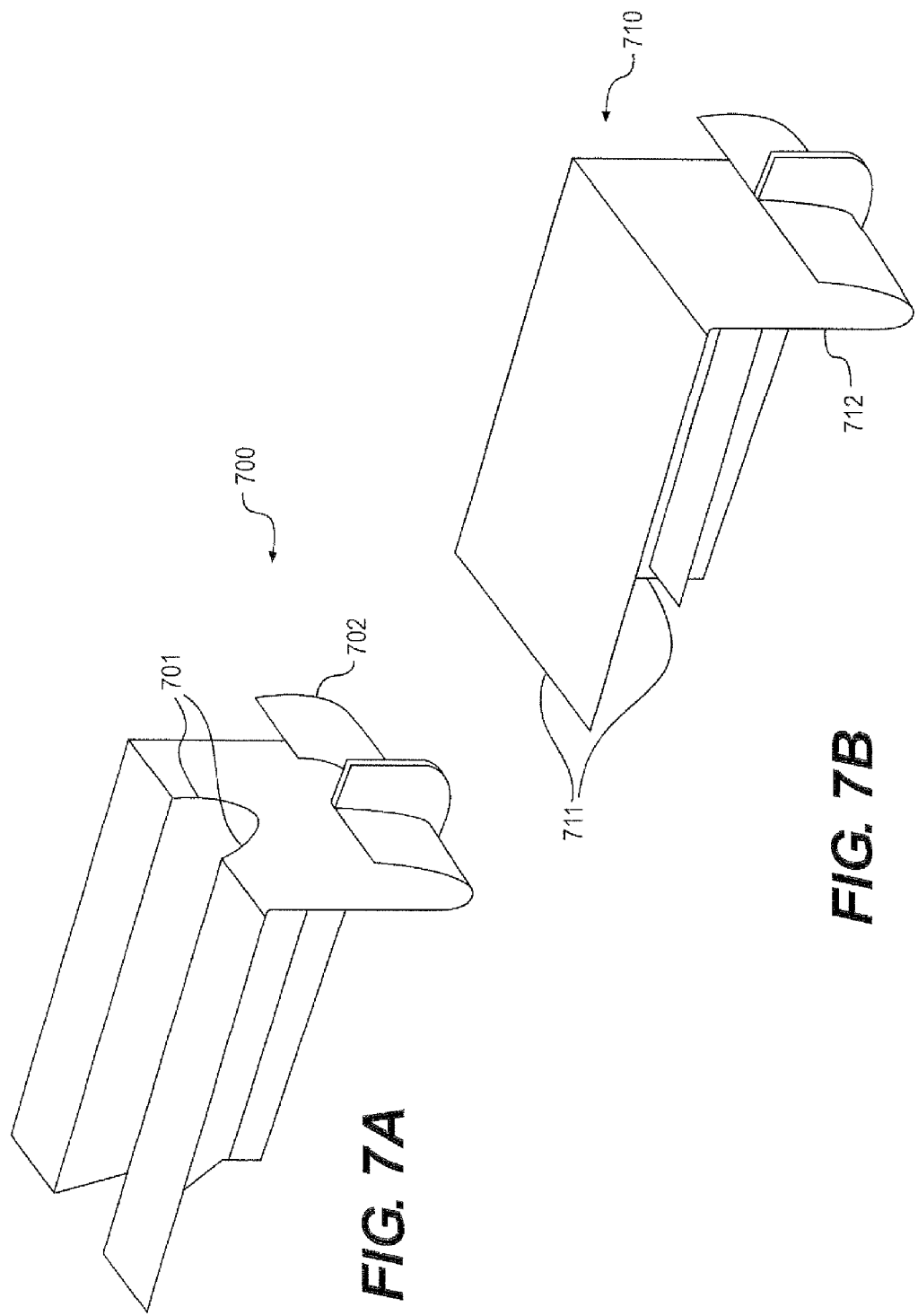

DECK SYSTEM AND COMPONENTS

CROSS REFERENCE TO RELATED APPLICATION

This application claims priority to U.S. Provisional Patent Application Ser. No. 61/602,346, entitled "Deck System and Components", filed Feb. 23, 2012, the entire disclosure of which is hereby incorporated by reference in its entirety.

BACKGROUND

1. Field of the Invention

Various aspects of the invention relate to structures such as floors, roofing and exterior decking, and more specifically, relate to deck boards, deck planks, porch boards, flooring, the connection of adjacent boards to each other, the connection of the end of boards to each other, and various accessories used with such structures.

Certain aspects of the invention relate to the management of rain water & melting snow to keep the underside of a deck system substantially dry, providing for storage of articles and the ability to have a first floor patio/deck area underneath it without rain water affecting the enjoyment of the space or reaching the foundation of the house.

2. Description of Related Art

Deck systems are in wide use in both residential and commercial applications. Some deck systems consist of simple wooden boards having a rectangular cross-section each arranged longitudinally parallel to each other onto a supporting structure. Similar systems are in use with the deck boards being made of manmade material such as a composite or plastic based material.

These known systems sometimes have several disadvantages. For example, the parallel boards usually are spaced apart from each other laterally to some degree, and even if the deck boards are abutting each other along their length, there is generally still some type of gap between them. This gap between the long edges of the boards allows water to pass through. Thus, when natural rain water or a cleaning water, spilled water, melting snow or other liquid contacts the top surface of the deck boards, it will typically leak down through between the deck boards. This can be undesirable in situations where it is preferred that the region under the deck surface be kept dry. Such situations include structures having a deck surface on an upper floor and a residential area on a lower floor beneath the deck surface. Other situations where it is preferred that the region under the deck surface be kept dry include decks having a dirt surface beneath the deck surface. By keeping the dirt surface beneath the deck surface dry, the resident may prevent the dirt beneath the deck surface from becoming a haven for insects and weeds. In other commercial or industrial uses, it is desirable to keep liquids on the upper surface from inadvertently dripping to the lower area. In addition, where deck boards are also end-to-end, there is typically a space between the end surfaces of the deck boards. In some instances a relatively wide space is left between the ends of the deck boards in order to allow for a thermal expansion and contraction of boards placed end to end. This gap also can allow for undesirable fluid leakage or liquid leakage under the deck as described above.

Another disadvantage of some deck boards is that in some instances it is necessary to screw the deck boards down to the supporting structure and in a conventional rectangular cross-section board, the screw heads are exposed on the top surface which may be undesirable for cosmetic or other reasons.

SUMMARY

In light of the present need for improved decking systems and accessories, a brief summary of various embodiments is presented. Some simplifications and omissions may be made in the following summary, which is intended to highlight and introduce some aspects of the various embodiments, but not to limit the scope of the invention.

Various embodiments disclosed herein can relate to new and useful decking board constructions. For example, the decking board may feature an extruded cross-section having a generally tongue-and-groove mating fit between lateral and adjacent boards. In various embodiments, the decking board may be a symmetrical, two sided product, with each side optionally having different pattern or color, thereby creating two products in one. One side of the board may feature an upwardly directed U-shaped hook next to a downwardly directed groove or channel. The other side of the decking board may have a complimentary, but opposite shaped, downwardly directed U-shaped hook adjacent to an upwardly directed groove or channel. When the boards are interlocked side-to-side, each hook will mate into each groove thereby providing secure connection between the boards. Further, since the tongues and grooves are overlapping, there is no vertical path for water on the top of the board to pass in between the boards. In various embodiments, the upwardly directed U-shaped tongue forms a primary water channel to collect and direct water along the length of the structure to the end of the structure.

In another aspect, a flashing element may be provided to act as a butt joint to connect the butt ends of the boards. The flashing element has a complimentary shape to the upper surface of the board, and can reside in longitudinal grooves that are cut into the butt ends of the boards. The flashing can also be a sharpened and or hardened element which is installed by tapping the first sharp end of the flashing element into the relatively soft edge of the first board, and then bringing the second board into contact with the second end of flashing element and then tapping the far end of the second board so that the second edge of the flashing element is pushed into the relatively soft first end of the second board. When installed, the flashing prevents water from passing downward between the butt ends of the boards. In various embodiments, the flashing allows for expansion and contraction of the boards due to fluctuations between hot and cold environments. In one embodiment, a metal flashing that taps into place can be held in place by an integral structure that then presses or affixes onto one or more edges of the board or boards and holds it in place to make assembly easier.

Another embodiment of the butt joint involves installation of a polymer part having a primarily "V-shaped" profile that flexes. The polymer part having a primarily "V-shaped" profile is installed between the butt ends of the planks. The flexing of the polymer part ensures a tight fit is maintained during expansion and contraction of the planks.

In another aspect, the boards may feature one or more longitudinal hollow regions. The longitudinal hollow regions may accept a heating element such as a heatable wire or a heating fluid conduit or hose. Other heating elements such as radiant heating elements or hot air containing passages may reside in or be part of the interior of the board. In some instances, a particular longitudinal hollow shape may be provided, or the heating elements may be embedded in the structure during manufacture.

In addition, at least one flexible member may be added inside the tongue and groove area on either part to align the planks when originally installed tightly together and to also withstand the expansion and contraction of the planks in the widthwise direction during hot and cold weather. Initially, at points of contact between adjacent tongues and grooves of adjacent boards, a bumper protrusion may be provided on one board which will frictionally engage with a complimentary groove on the other board.

In another embodiment, a gutter may be added to the perimeter of the deck surface to collect the water that is shed from the surface and direct it downwards in a controlled fashion to connectors connecting to a leader which guides water away from the underside of the deck.

In another embodiment, the addition of a perimeter element may take the form of a bull nose type extrusion that provides some protection to the end boards when objects come in contact with the end of the deck. This may be particularly useful where the ends of the deck may come in contact with vehicles such as carts or, where the deck is being used as a dock and may come in contact with watercraft.

In another embodiment, a decking board comprises first and second longitudinal sides. The first longitudinal side has a male projecting member with an upwardly directed rib and the second longitudinal side has a female slot defining a downwardly directed rib. The boards can be interlocked adjacent each other with the upwardly directed rib snapped past the downwardly directed rib to form a frictional engagement therebetween. A central main body portion is disposed in longitudinal sides.

In another aspect, a dock board may be provided in the form of a relatively simple dock board extrusion.

BRIEF DESCRIPTION OF THE DRAWINGS

In order to better understand various exemplary embodiments, reference is made to the accompanying drawings, wherein:

FIG. 2A shows a number of decking boards according to the embodiment of FIG. 1F in an installed condition.

FIG. 2B shows additional details of the system of FIG. 2A.

FIG. 3A illustrates a drain and gutter system.

FIG. 3B is an exploded view of the system of FIG. 3A.

FIG. 3C is a further exploded view of the system of FIG. 3A.

FIG. 6 shows a bull nose component for mounting to the end a deck or dock system.

FIGS. 7A and 7B show polymer parts which aid in connecting planks of FIG. 1 in an end-to-end relationship.

DETAILED DESCRIPTION

Figure 1A:
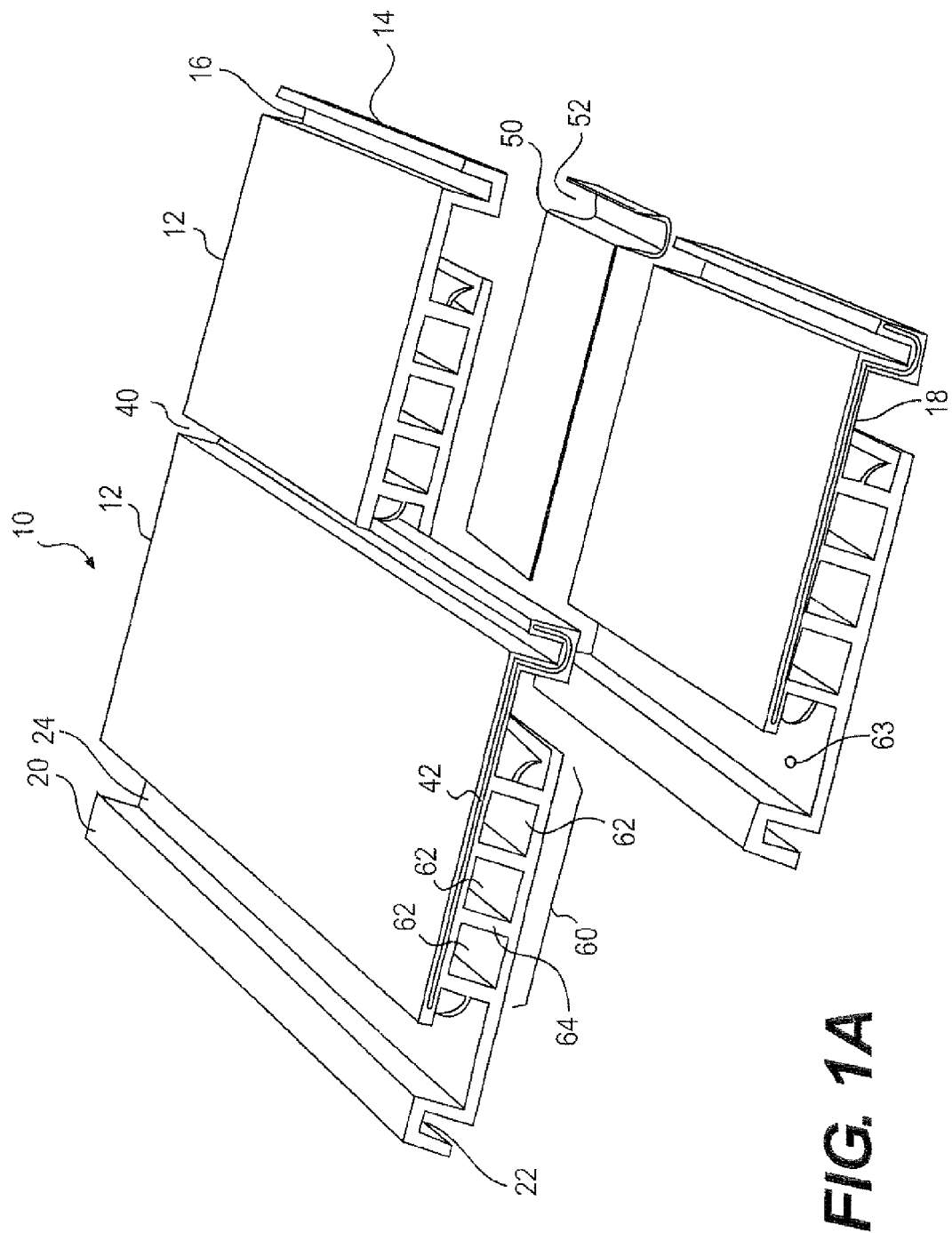
FIG. 1A shows various elements of a decking system, including decking boards and a flashing element.
Figure 1B:
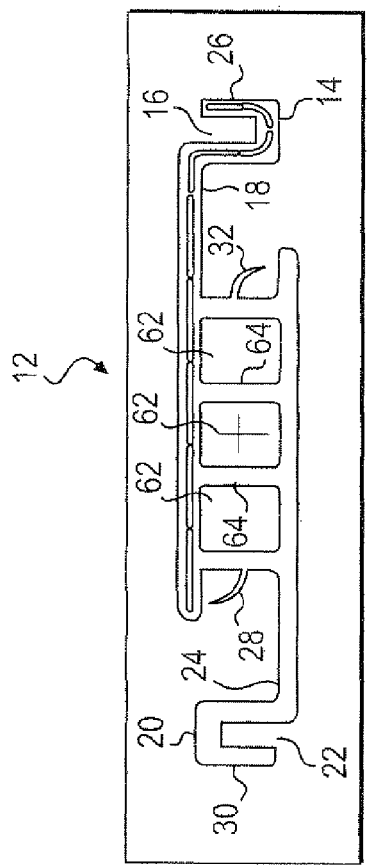
FIG. 1B is a cross-section of the embodiment of FIG. 1A.

Referring now to the drawings, in which like numerals refer to like components or steps, there are disclosed broad aspects of various exemplary embodiments.

The board is used herein to refer to any type of longitudinal surface or substrate board. Some embodiments are referred to as decking boards, but any embodiments could be used in porches, floors, roofing or other uses as will be understood by one skilled in the art of construction components.

Various embodiments disclosed herein can relate to new and useful decking board constructions. For example, the decking board may feature an extruded cross-section having a generally tongue-and-groove mating fit between lateral and adjacent boards. One side of the board may feature an upwardly directed U-shaped hook next to a downwardly directed channel. The other end of the decking board may have a complimentary, but opposite shaped, downwardly directed U-shaped hook adjacent to an upwardly directed groove. When the boards are interlocked side-to-side, each hook will mate into each groove thereby providing secure connection between the boards. Further, since the tongues and grooves are overlapping, there is no vertical path for water on the top of the board to pass in between the boards. In addition, the downwardly directed U-shaped tongue forms a water channel to collect and direct water along the length of the structure to the end of the structure.

FIG. 1A depicts a deck system 10 including a plurality of decking boards 12. Each board 12 has a downwardly directed tongue 14 which has an upwardly facing groove 16. Located inward of the downward facing tongue 14 is a downward facing groove 18. A reversed structure is provided on the other side of the board 12 including an upward facing tongue 20 having a downward facing channel 22. Located inward of the upward facing tongue 20 is an upward facing groove 24. FIG. 1A also shows the boards interconnected with each other with the downward facing tongue 14 residing in the upward facing groove 24 of an adjacent board. The farthest edge 26 of the downward facing tongue 14 slides against a resilient tab 28. Similarly, the outer surface 30 of the board will abut against a tab 32 in an adjacent board. In the assembled system, therefore, a water collecting channel 40 is provided which appears from the upper surface of the deck as a simple downward rectangular channel. In various embodiments, the boards are symmetrical so the customer can turn the decking boards upside down while still allowing interconnection between the boards. In some embodiments, the symmetrical boards have identical patterns and colors on each side. This contributes to ease of assembly, as each board may be used with either side uppermost. In some embodiments, the symmetrical boards have different patterns or colors on each side. The presence of different patterns or colors on each side of the decking boards allows the customer to choose between two different or complementary surface styles while buying only one board item version.

In another aspect, a flashing element may be provided to connect the butt ends of the boards. The flashing element has a complimentary shape to the upper surface of the board, and can reside in longitudinal grooves that are cut into the butt ends of the boards. When installed, the flashing element prevents water from passing downward between the butt ends of the boards. This is true even if a relatively wide end to end gap is selected to allow for thermal expansion and contraction.

Into the end of each board is cut a slot 42 which extends a predetermined distance into the board, but not all the way through its length. The slot 42 is sized to receive the insertion of a flashing element 50. The flashing element, therefore, resides in the slots 42 in the butt ends of boards 12 placed end to end, and prohibits any water flow between the ends of the boards. To the extent the flashing element 50 is visible between butt end gap between the boards, any liquid that contacts the flashing will be directed into a channel portion 52 of the board and will, once a certain volume of liquid is reached, be carried away by channel 40. The flashing element 50 can be made from folded or extruded metal and may have its edges sharpened for tapping into place into slots 42 in the butt ends of the boards.

In various embodiments, the flashing can be a sharpened and/or hardened element which is installed by tapping the first sharp end of the flashing element into the relatively soft end of a first board, and then bringing a second board into contact with the second end of flashing element and then tapping the far end of the second board so that the second edge of the flashing element is pushed into the relatively soft first end of the second board. In such embodiments, the presence of slots 42 in the butt ends of boards 12 is optional.

A feature of the boards 12 shown in FIG. 1A is that they can be slid together along their length. That is, rather than snapping the boards in together to mate from the top, which is possible, another assembly option is to slide the boards together end to end, one next to another. Accordingly, boards can be assembled into an overlapping deck without the use of any hardware to hold the boards to each other.

A device for facilitating formation of watertight butt joints is shown in FIG. 7A, It is a polymer part 700 that has a primarily "V-shaped" profile 701 that flexes during installation between the butt ends of the planks. The butt ends of the planks contact the outer surface of the "V-shaped" profile 701. Flexing of the profile 701 ensures a tight fit is maintained during expansion and contraction of the planks. The polymer part 700 may also have a hidden tape or other sealant material to keep the butt joint in place and provide further water sealant ability. The polymer part 700 may have one or more snap provisions to hold it down in place between the ends of the planks. This "V-shaped" profile 701 directs the water that would normally have fallen between the ends of the planks into channel 702, which fits into rain grooves 40 in the planks and bridges rain grooves in two planks in an end-to-end relationship. Channel 702 guides water into the rain groove 40 in FIG. 1A.

Another embodiment of the device for facilitating formation of watertight butt joints is shown in FIG. 7B, and is a polymer part 210 that has a primarily "T-shaped" profile 711 installed between the butt ends of the planks, with the vertical member of the "T-shaped" profile 711 fitting between the butt ends of the boards. The polymer part 710 may have a sealant or tape used to keep it in place and may have one or more snap provisions to keep it in place between the ends of the deck planks. The horizontal member of the "T-shaped" profile 711 covers the top surface of the planks and has a "U-shaped" extension forming channel 712 that fits on top of and spanning the space between the ends of the rain grooves 40 of the planks whose ends are being joined. This embodiment may or may not have some sealant, tape or snap fit to help hold it into place.

In an alternate embodiment, a device for facilitating formation of watertight butt joints is a polymer part 710 that has a primarily "I-shaped" profile installed between the butt ends of the planks, with the vertical member of the "I-shaped" profile fitting between the butt ends of the boards. The "I-shaped" profile has an upper horizontal member which covers the top surface of the planks and has a "U-shaped" extension forming a channel that fits on top of and spans the space between the ends of the rain grooves 40 of the planks whose ends are being joined. The "I-shaped" profile has a lower horizontal member. The butt ends of the boards fit between the upper and lower horizontal members.

Device 700 and 710 for facilitating formation of watertight butt joints may have a snap fit feature for securing them between boards.

Returning to FIG. 1A, the boards may also be assembled by installing a first board having an upwardly facing groove 24, and then connecting a second board having a downwardly facing tongue 14 to the first board. This is done by placing the downwardly facing tongue 14 of the second board over the already installed first board. Then the second board's downwardly facing tongue 14 is aligned over the first board's upwardly facing groove 24 and the second board is dropped down onto and over the top of the edge of the first board so tongue 14 goes into groove 24. The second board then slides into the groove 24 of the first board, tightly against the first board, so that the edge 26 of the downward facing tongue 14 slides against a resilient tab 28 in groove 24. The edge 26 of the downward facing tongue 14 makes tight contact with tab 28. This creates a perfect alignment between the boards as the installer puts screws down onto the surface of grooves 24, securing the boards in place. This also contributes to the water tightness of channel 40, which also has upwardly facing and downwardly facing interconnecting elements. The resilient tab 28 allows for thermal based expansion of the boards after assembly. It may be desirable to mount the boards to an underlying structure (this will be described further with reference to FIG. 2A using the board of FIG. 1F). The board of FIG. 1A provides a conveniently accessible mounting location for such screws through the surface of the groove 24, which may or may not be pre-drilled with holes 63 for ease of installation.

In another aspect, the boards may feature one or more longitudinal hollow regions 62. The longitudinal hollow regions may accept a heating element such as a heatable wire or a heating or cooling fluid conduit or hose. Other thermal elements such as radiant heating elements or hot air containing passages may reside in or be part of the interior of the board. In some instances, a particular longitudinal hollow shape may be provided, or the heating elements may be embedded in the structure during manufacture.

The board 12 also includes a main body region 60. This main body region 60 may be solid or may be provided with one or more hollow regions 62. The hollow region 62 may provide a number of benefits including, for example, reducing the weight of the board compared to a solid board. Further, the hollow region 62 may allow for the insertion of heating devices. The board depicted in FIG. 1A also features stiffening ribs 64. These ribs 64 can provide stiffening, and can also maintain heater cables separate from each other if they are installed in back and forth rows.

It is also noted that the openings 62 may have a wide variety of shapes as are shown in the other figures, and other cross-sectional shapes. In addition to or instead of containing heating elements, other items such as wires for power outlets, speakers, dog fences, or other wire based products may be passed through the hollow portions 62.

In another aspect, a flexible assembly tab or member such as tab 28, 32 and 128 may be provided on the boards near the tongue and groove region to provide a firm frictional contact between the adjacent tongues and grooves and to align the boards during assembly. Initially, at points of contact between adjacent tongues and grooves of adjacent boards, a bumper protrusion may be provided on one board which will frictionally engage with a complimentary groove on the other board. It is also noted that tabs 28, 32 and 128 provide a stop feature during the assembly process, but further allow for lateral expansion and contraction of the boards during temperature extremes. The tabs 28, 32 and 128 may be referred to as flexible members. The resilient or flexible members may provide for alignment and frictional engagement. They may thus be in a slightly bent configuration in the assembled state. However the tabs may also be sacrificial in that they are designed to be breakable or frangible, that is, they may break off upon application of sufficient force during installation of adjacent boards.

Figure 1C:
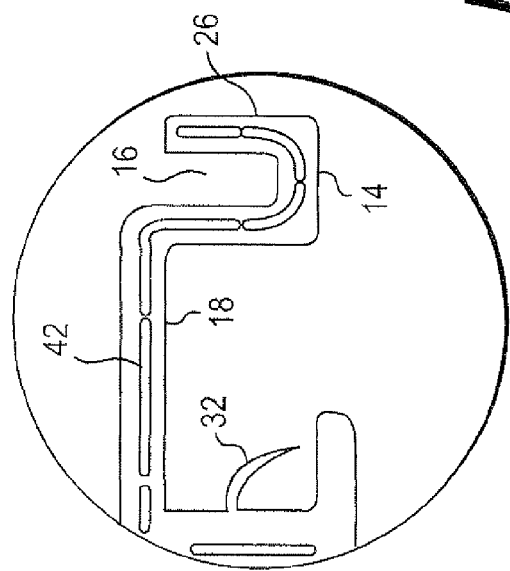
FIG. 1C is a detailed view of a part of the cross-section of FIG. 1B.
Figure 1D:
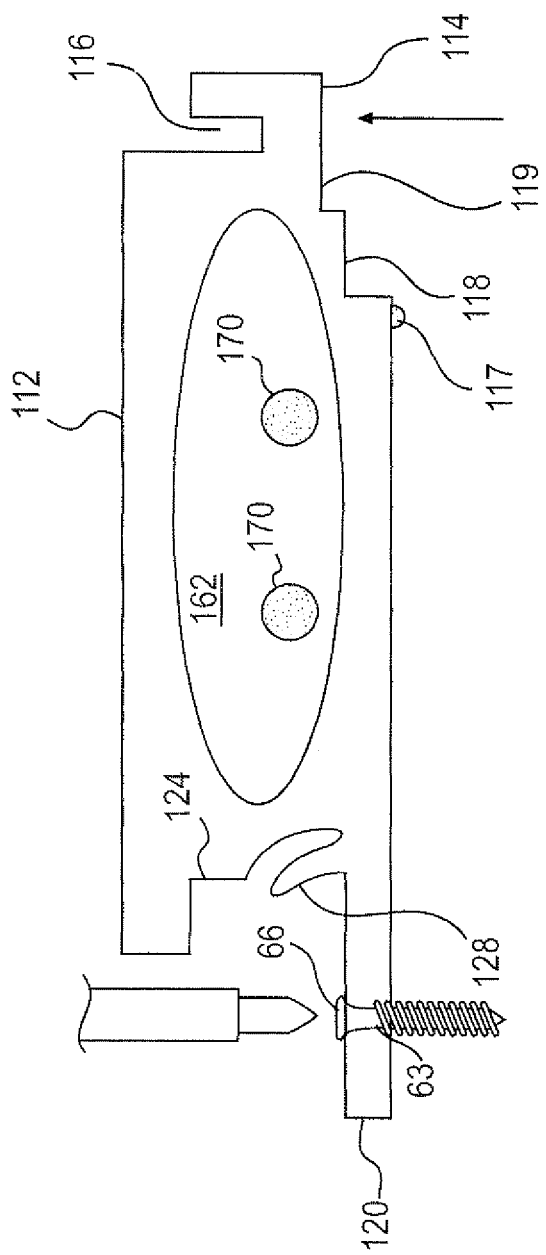
FIG. 1D shows a cross-section of one embodiment of a decking board.

FIG. 1D shows a decking board having a different cross-section from FIG. 1A. This board 112 may be thought of as having a tongue 114 which projects into a groove 124. An upward facing channel 116 is provided that will function similarly to the channel 16 described above. A resilient tab 128 is also provided. Instead of an upwardly directed tongue, this embodiment features a laterally extending tongue 120. The tongue 120 can provide for a screw location similar to that in the channel 24 and may or may not be pre-drilled with holes for easy assembly. The tongue 120 can also nest in a rectangular notch 118 provided on the other side of an adjacent board. An additional relief area 119 is provided on the lower surface of the tongue 114 which permits clearance for a screw head. The embodiment of FIG. 1D features a single central hollow area 162. FIG. 1D also schematically depicts heating elements 170 in hollow portion 162.

Figure 1E:
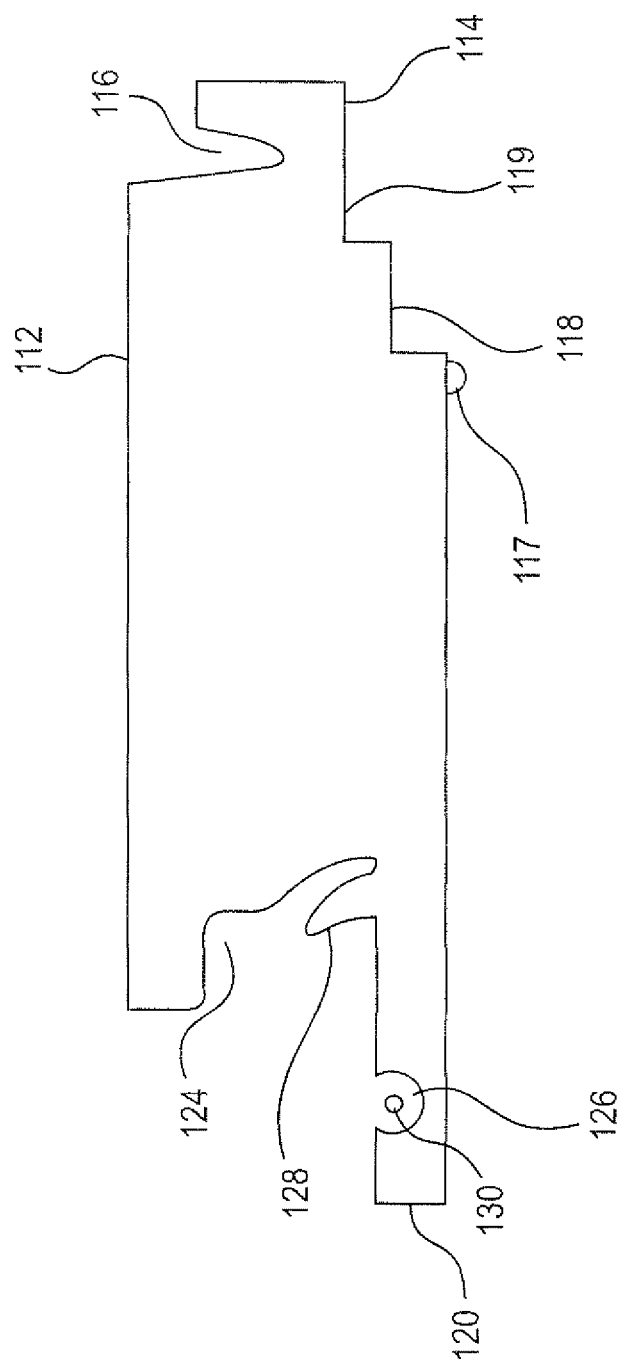
FIG. 1E shows a cross-section of another embodiment of a decking board.

FIG. 1E shows a deck board similar to the board of FIG. 1D, but without the central hollow area 162. FIG. 1E shows a decking board having a tongue 114 which projects into a groove 124. A resilient tab 128 is also provided. This embodiment features a laterally extending tongue 120. The tongue 120 can nest in a rectangular notch 118 provided on the other side of an adjacent board. The embodiment of FIG. 1D optionally includes a pivot bump 117, and a pocket 126. Pocket 126 is adapted to receive a mounting screw. However the pocket 126 can also serve as a track for accepting a longitudinal heating wire 130 as shown.

Figure 1F:
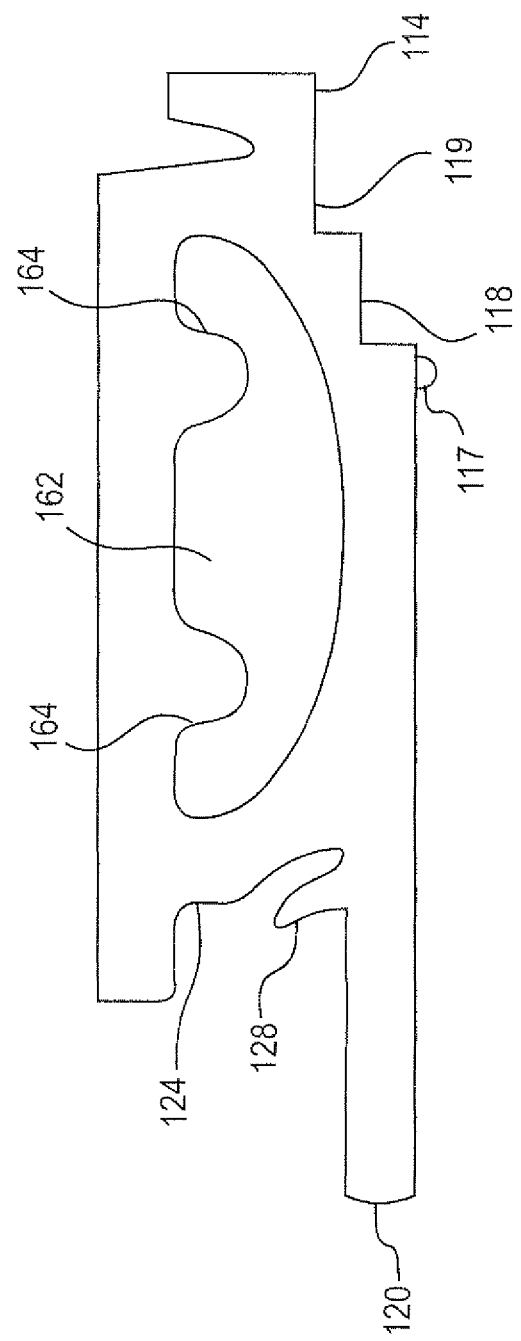
FIG. 1F shows a cross-section of yet another embodiment of a decking board.

FIG. 1F shows a deck board having a similar outer profile to that of FIGS. 1D and 1C, but having a central hollow opening 162 that includes stiffening ribs 164. FIG. 1D also illustrates that the lower surface of the hollow region 162 has a parabolic concave upward shape to reflect heat upwards. A fastener 66 is shown being screwed into hole 63 for mounting.

FIGS. 2A and 2B show additional details utilizing the board of FIG. 1F. In this embodiment, the board of FIG. IF has been further provided with a bump/rib 115 and a corresponding bump/rib 125. Instead of both items 115 and 125 being projecting bumps, one or the other could be a small groove notch, dimple or detent. It will be appreciated that as shown in the lower portion of FIG. 2A, the bumps/ribs 115 and 125 can engage each other to enhance the frictional connection of adjacent boards. Another bump or protrusion 117 may be placed at the edge of the bottom surface next to 118. This bumper creates a pivot point for the plank so that when fastening the board at area 120, the wall tongue 114 is pushed upwards to create a tight fit between the seal elements 115 & 125. Further, FIG. 2A depicts installation screws being placed through the laterally extending tongues 120.

In this embodiment, a top surface 111 of each board 112 has a slightly crowned surface to direct water towards the water channels 140 between the boards. FIG. 2A also shows further details of the interaction between the bump/ribs 115 and 125, and screws 127.

Figure 2C:
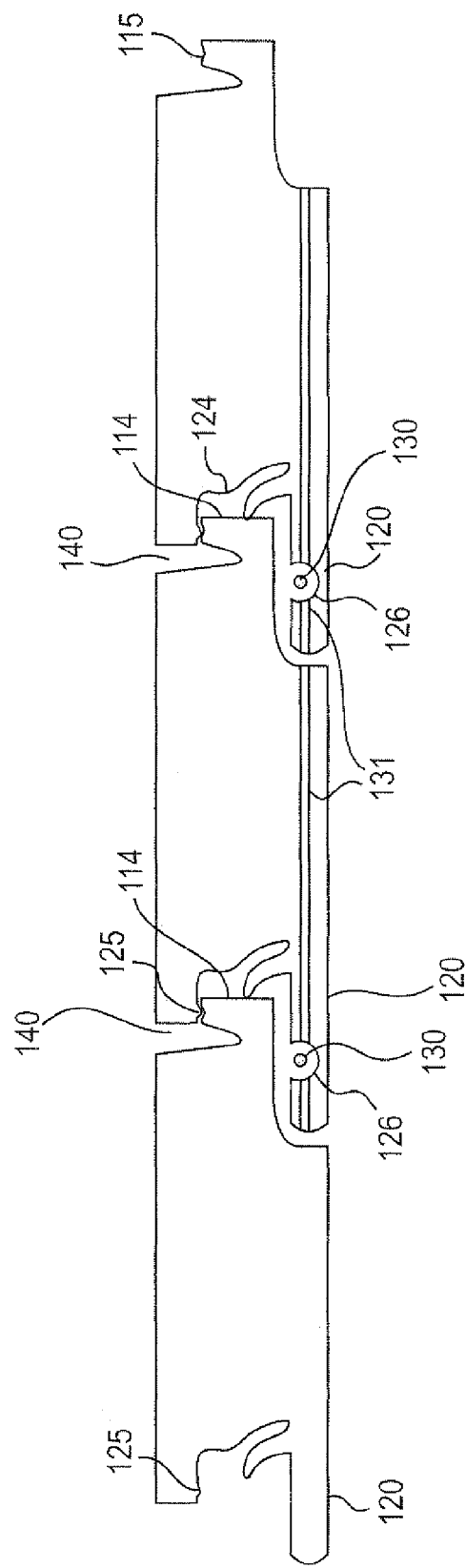
FIG. 2C shows a number of decking boards according to the embodiment of FIG. 1E in an installed condition.
Figure 3D:
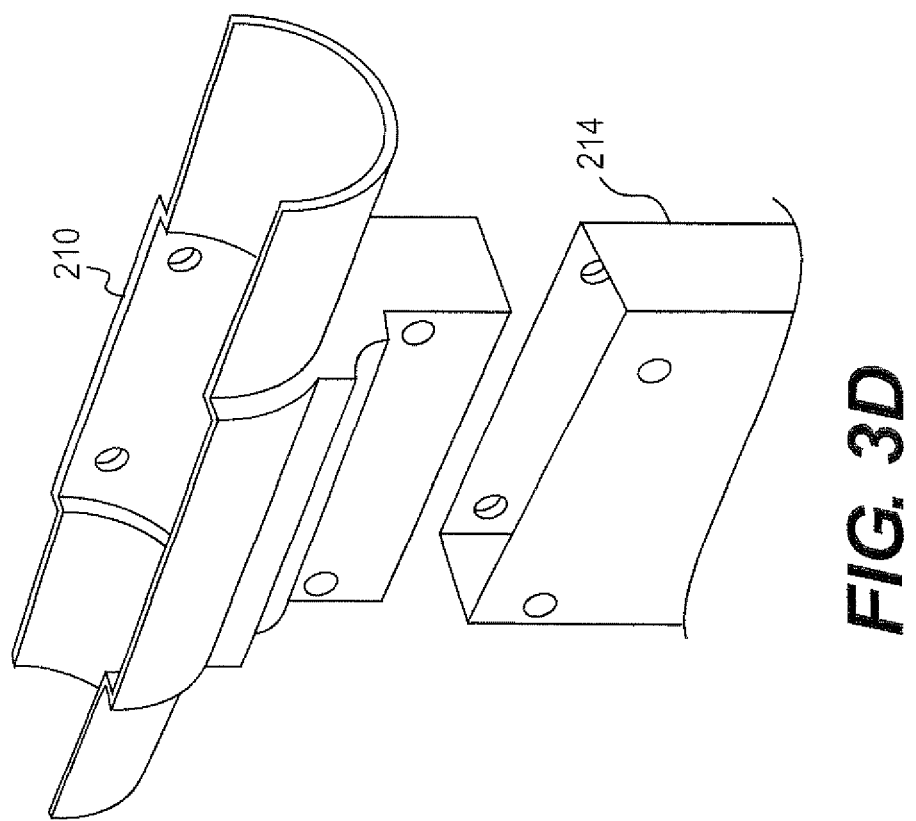
FIG. 3D depicts components of the drain and gutter system.

FIG. 2C shows an embodiment in which the board has been further provided with a bump/rib 115 and a corresponding bump/rib 125. In the embodiment of FIG. 2C, the boards are provided with pockets 126, and are assembled so that pockets 126 of the boards are aligned under tongues 114 of an adjacent board. The water channel 140 defined by tongue 114 of the adjacent board is thus positioned above pocket 126. Pocket 126 is provided with heating wire 130. Heating wire 130 provided in one board thus serves to heat channel 140 defined by tongue 114 of the adjacent board. Channel 140 is a groove for carrying rainwater. Heating wire 130 serves to prevent rainwater or melting snow in channel 140 from freezing.

At the end of a board, the wire 130 may be bent and wrapped around the end of the plank to an adjacent plank. The wire then fits into pocket 126 on the adjacent plank, and travels longitudinally along the adjacent plank. Notches 131 may be provided at the ends of the boards to guide the wire from one plank to another. Heating wire 130 can be a cylindrical wire or a flat or rectangular wire having two opposed major surfaces and two opposed edge surfaces. If a flat wire is used, then the wire should be arranged so that the opposed major surfaces are vertical, i.e., perpendicular to the upper surface of the boards. If the opposed surfaces are horizontal, it is more difficult to bend the wire at the end of the plank.

Pocket 126 and heating wire 130 may also be installed in the outer edge of tongue 114 or in groove 124. Each of these locations places the heating wire in proximity to channel 140, allowing the heating wire to heat water in the channel.

In another aspect, a drain system may be provided at the longitudinal end of a deck that is made up of adjacent boards. The drain system may include a main T-downspout piece which collects and directs water to a leader, and individual adjacent gutter pieces that connect to the T-downspout. These can be mounted at the ends of the boards on the supporting structure.

Figure 3E:
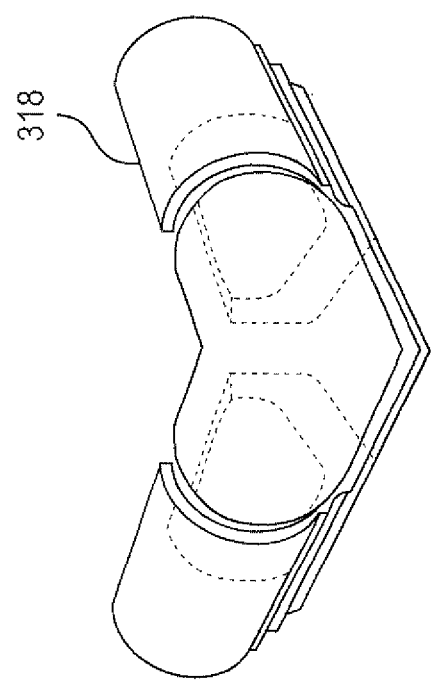
FIG. 3E shows a drain and gutter system corner connector

FIGS. 3A, 3B, 3C and 3D depict various components of a gutter system. The gutter system can be used with any deck that can direct and shed surface water, including the decking systems described herein. The gutter system generally includes a main T-downspout 210 and adjacent gutter pieces 212. The main T-downspout 210 can connect with a leader downspout 214. The gutter portions 212 may feature an outwardly curved projecting shape 212a which may provide some bumper protection for the end of the overall decking structure and provide a pleasing appearance by hiding the cut edges of the planks and hiding the heater wire that may be installed and running through and between each plank. Such a rounded outward portion may also be provided on the main T-downspout (although not shown) or this feature may be provided by a separate cover 216 that can be mounted along with T-downspout to cover it as shown. FIG. 3 illustrates these components and further illustrates a corner piece 318.

Figure 4:
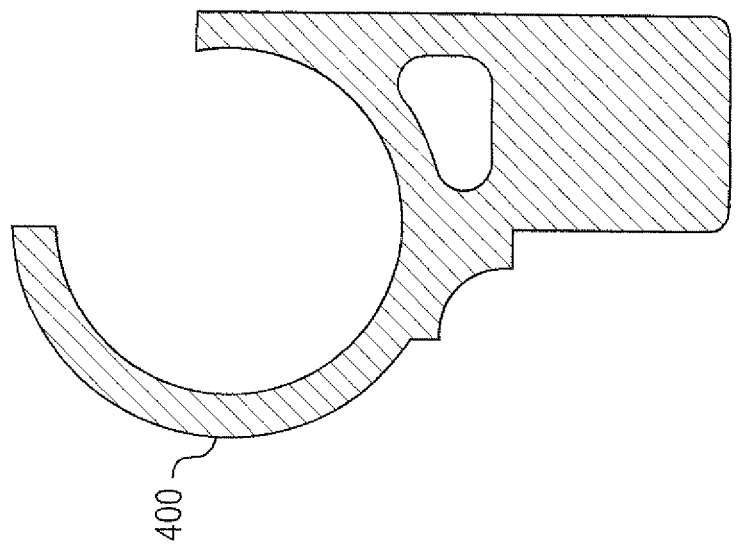
FIG. 4 shows a cross-section of a component of the drain and gutter system having a bull nose profile.

In another embodiment, the gutter may form a bull nose type extrusion that provides some protection to the end boards when objects come in contact with the end of the deck. This may be particularly useful where the ends of the deck may come in contact with vehicles such as carts or, where the deck is being used as a dock and may come in contact with watercraft. FIG. 4 shows a cross-section of a bull nose structure 400 that can provide a relatively simple gutter and/or bumper item that may be mounted on the edge and the end of a deck system. Alternatively, the lower portion of this type gutter extrusion can be made of various lengths so as to be useful for cutting off and using as a trim board in other areas of the deck as needed.

Figure 5:
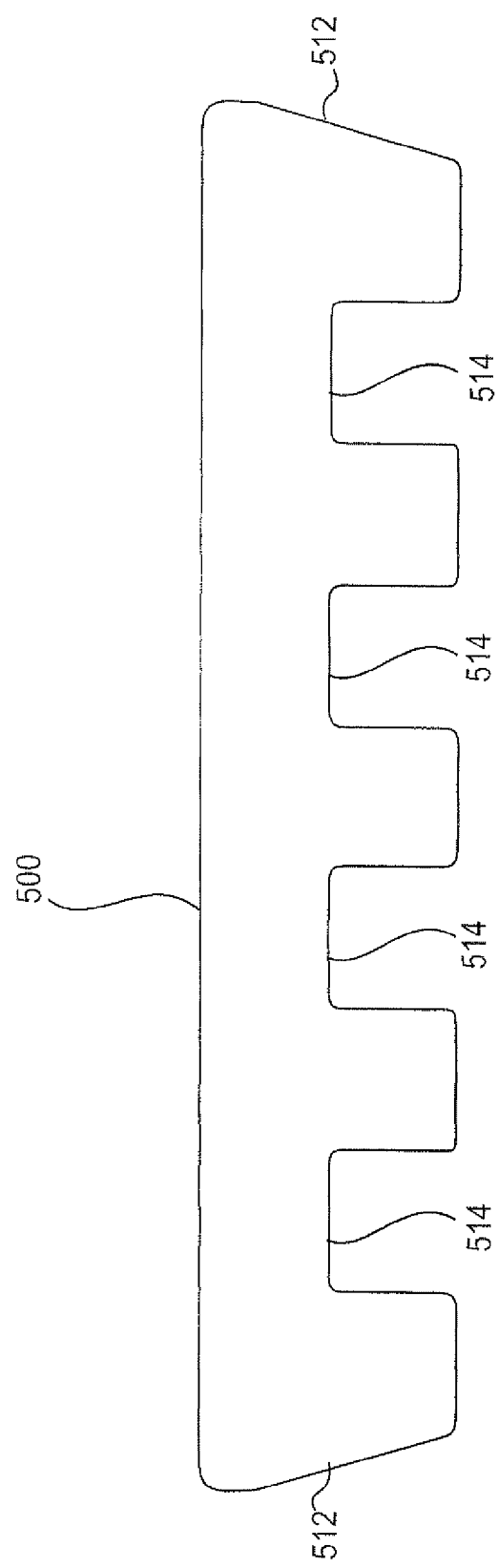
FIG. 5 shows a simplified decking board in the form of a dock plank.

In another aspect, a dock board may be in the form of a relatively simple dock board extrusion. FIG. 5 shows a deck board in the form of a relatively simple dock plank. This plank 500 features a relatively flat top surface, tilted sides 512, and upwardly directed recesses 514. The recesses 514 may assist with saving weight by still providing longitudinal bending strength.

In another aspect, a bull nose structure may be provided that does not provide water gutter features, but rather provides a projecting cushion structure at the end of the deck similar to the bull nose described above. FIG. 6 depicts a bull nose structure that can be used similar to the bull nose of FIG. 4. However, this structure has a different cross-sectional shape with structure 600 has a different cross-sectional shape including a mounting tab 612, and a rounded compressible projection 614 that has a central lap 616.

Any or all of the various deck boards, dock boards, downspouts, gutters or bumpers and other components can be manufactured from any suitable material. In many embodiments, the various items can be manufactured by extrusion methods. Any suitable extrudable material may be used. In some embodiments the boards can be manufactured using a compression molding process. In some examples, the items may be manufactured, by extruding or otherwise, from hydrophobic polymers, i.e., PVC or polyolefins, and hydrophobic coconut coir fibers which have been treated to remove coconut coir therefrom. In various embodiments, the composite items may be manufactured without any step chemically modified coconut coir fibers. However, the disclosure herein is not limited to the use of coconut based materials. For example, as an alternative to coir fibers, extruded materials may include ramie or bamboo fibers to reinforce polymeric products. In other embodiments, the materials may simply be extruded or molded from polymeric and/or wood based composite extrudable or moldable materials. Simple plastics may also be used. Further, it may be preferable to manufacture the flashing of a metal such as stainless steel or extruded metals.

The decking boards may be made by extrusion of a thermoplastic material, i.e., polyester, polyvinyl chloride, or polyolefin, preferably polyethylene or polypropylene. The thermoplastic material may contain a filler, including organic fillers such as wood powders, wood fibers, and coir fibers; inorganic fillers, such as glass fibers, carbon fibers, mineral fibers, silica, alumina, titania, carbon black, nitride compounds, and carbide compounds. The decking boards may be uncoated, or coated with a decorative coating of paint. The decking boards may be coated with a protective coating. The protective coating may be applied by coating a mixture of monomers and/or oligomers on the completed board, and then curing the coating to form a protective coating.

Coated decking boards may also be made by coextrusion of:

a core layer comprising a thermoplastic material, i.e., polyethylene or polypropylene, containing optional fillers, including organic fillers such as wood powders, wood fibers, and coir fibers; inorganic fillers, such as glass fibers, carbon fibers, mineral fibers, silica, alumina, titania, carbon black, nitride compounds, and carbide compounds; and a coating layer (such as for example PolyEthylene with additives) of a protective thermoplastic polymer. Suitable protective polymers include polyvinyl chloride; acrylic resins, i.e., poly(ethylene-co-methacrylic acid) (Surlyn®); polyester; polycarbonate; and polystyrene.

In various embodiments, the coating layer contains UV stabilizers which reduce the likelihood of the core layer undergoing degradation from exposure to ultraviolet light. Such UV stabilizers include organic light stabilizers, such as benzophenone light stabilizers, hindered amine light stabilizers, and benzotriazoles; and inorganic light stabilizers. such as barium metaborate and its hydrates.

In various embodiments, the coating layer contains antifungal agents which increase resistance of the board to mold and other organisms. The antifungal agents may be incorporated in the coating layer alone, or in both the core and coating layers. Useful antifungal agents for coatings include copper (II) 8-quinolinolate; zinc oxide; zinc-dimethyldithiocarbamate; 2-mercaptobenzothiazole; zinc salt; barium metaborate; tributyl tin benzoate; his tributyl tin salicylate; tributyl tin oxide; parabens: ethyl parahydroxybenzoate; propyl parahydroxybenzoate; methyl parahydroxybenzoate and butyl parahydroxybenzoate; methylenebis(thiocyanate); 1,2-benzisothiazoline-3-one; 2-mercaptobenzo-thiazole; 5-chloro-2-methyl-3(2H)-isothiazolone; 2-methyl-3 (2H)-isothiazolone; zinc 2-pyridinethiol-N-oxide; tetra-hydro-3,5-dimethyl-2H-1,3,5-thiadiazine-2-thione; N-trichloromethyl-thio-4-cyclohexene-1,2-dicarboximide; 2-n-octyl-4-isothiazoline-3-one; 2,4,5,6-tetrachloro-isophthalonitrile; 3-iodo-2-propynyl butylcarbamate; diiodomethyl-p-tolylsulfone; N-(trichloromethyl-thio)phthalimide; potassium N-hydroxy-methyl-N-methyl-dithiocarbamate; sodium 2-pyridinethiol-1-oxide; 2-(thiocyanomethylthio)benzothiazole; and 2-4(-thiazolyl)benzimidazole.

The coating layer may help provide scratch resistance to the decking board surface, either by using a coating with a polymer which is harder than the core layer or through the use of certain additives. Additives which help increase scratch resistance in coatings include lubricants and very hard mineral fillers, including carbide and nitride ceramics.

The coating layer may also include inorganic pigments, organic pigments, or dyes as colorants. The coating layer may be embossed with a decorative pattern, i.e., wood grain or imitation stone.

In situations where a coating layer or "capcoat" is applied by coextrusion. the coating layer has a thickness of from about 0.01 to 0.25 inch, preferably from about 0.02 to 0.15 inch, more preferably from about 0.04 to 0.08 inch. The capcoat may cover the entire longitudinal surface of the board; the top and sides of the board, with the bottom surface being uncoated; or the top of the board, with the bottom surface and sides being uncoated.

As discussed above, at least one flexible member may be added inside the tongue and groove area on the decking planks to align the planks to help withstand expansion and contraction of the planks. Also, a bumper protrusion may be provided on a board which will frictionally engage with a complimentary groove on another board. In various embodiments made by coextrusion of a core material and a capcoat, these flexible members and bumpers may be formed from the same material as the core material, and optionally coated with the capcoat material. In various embodiments made by coextrusion, these flexible members and bumpers may be formed from the capcoat material alone. In certain embodiments, flexible members and bumpers formed from the capcoat material have increased toughness, resistance to breakage, and flexibility, when compared to embodiments in which flexible members and bumpers are made from the core material, i.e., a wood fiber- or coir fiber-filled polyolefin.

A further design for a flexible member produced from a capcoat polymer layer can be envisioned to be attached to the outside edge of the tongue portion, i.e., on the outside edge 26 of the tongue 14, or on the outer surface of rain-groove element 40, as seen in FIG. 1A. The flexible member produced from the capcoat polymer can thereby set the assembly gap between planks during installation. Additionally, a flexible member produced from the capcoat polymer and positioned on edge 26 may contact an inner surface of groove 24, when boards are fitted together as in FIG. 1A. This provides a flexible water seal between boards as boards expand with heat and then contract again.

A further design for a flexible member (not shown in FIG. 1C) produced from a capcoat polymer layer can be envisioned to be attached to the outer edge of the tongue portion 114 or 116, as seen in FIG. 1C, and adapted to contact the interior of groove 124, as seen in FIG. 1C. Contact between flexible members produced from a capcoat polymer layer and groove 124 of FIG. 1C produces a flexible water seal.

Also, a bumper protrusion may be provided on a board which will frictionally engage with a flexible member made of capcoat material on another board. The cap coat material is a tough resilient polymer, and may be used to produce watertight elements.

Figure 8A:
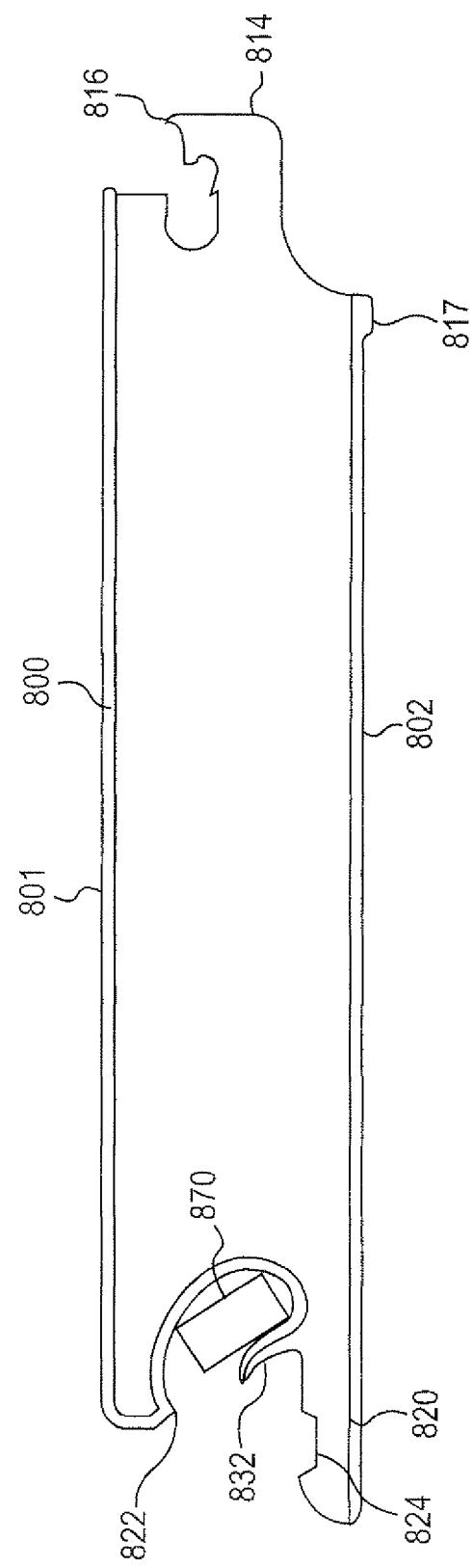
FIG. 8A is a cross-sectional view of another embodiment of a decking board.

FIG. 8A is a cross-sectional view of a board 800 having a top cap coat 801 and a lower cap coat 802. A male side of the board 814 includes an upwardly projecting bump 816 and a lower pivot bump 817. A female side 820 of the board includes a projecting bump 822 that can snap over and interlock with the projecting bump 816, a flexible tap 832, which can help hold the boards together in alignment, and accommodate for expansion of the boards, and a water drain channel 824. Further, the female end has an open area to the inside of the flexible tab 832 which can be sized and dimensioned to receive a heating wire or cable. FIG. 8A shows the heating element 870 as having a generally vertical rectangular cross-section.

Figure 8B:
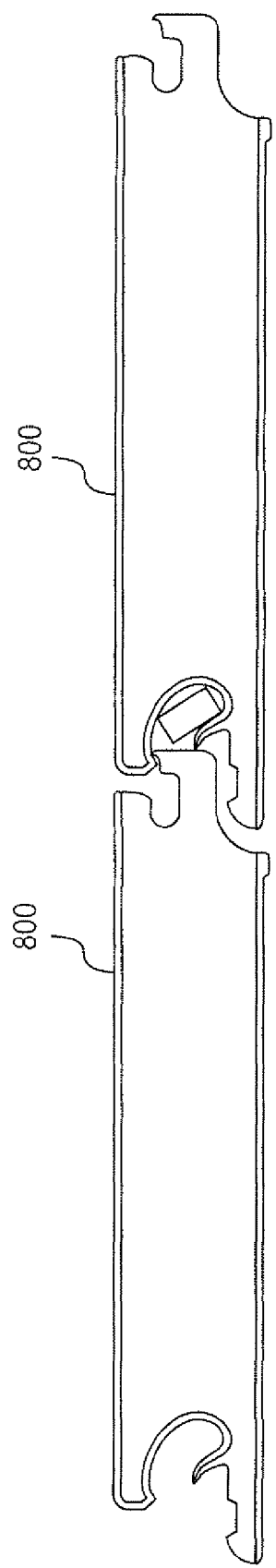
FIG. 8B shows two decking boards according to FIG. 8A joined together.

FIG. 8B shows two of the boards 800 interlocked adjacent to each other.

Figure 9A:
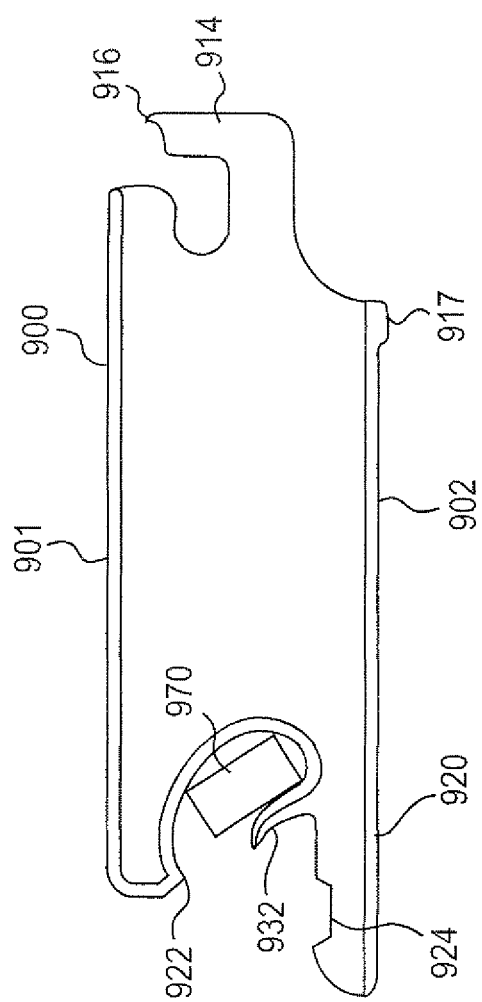
FIG. 9A is a cross-sectional view of another embodiment of a decking board.

FIG. 9A is a cross-sectional view of a board 900 having a top cap coat 901 and a lower cap coat 902. This board is narrower than that of FIG. 8I and thus may be more suitable for use as a porch board in some instances. A male side of the board 914 includes an upwardly projecting bump 916 and a lower pivot bump 917. A female side 920 of the board includes a projecting bump 922 that can snap over and interlock with the projecting bump 916, a flexible tap 932, which can help hold the boards together in alignment, and accommodate for expansion of the boards, and a water drain channel 924. Further, the female end has an open area to the inside of the flexible tab 932 which can be sized and dimensioned to receive a heating wire or cable. FIG. 9A shows the heating element 970 as having a generally vertical rectangular cross-section.

Figure 9B:
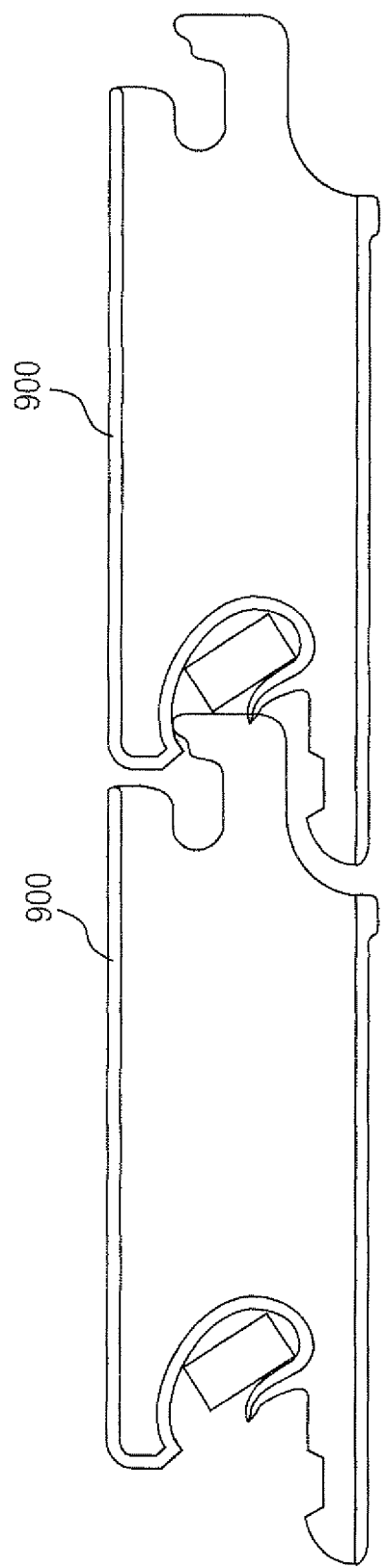
FIG. 9B shows two decking boards according to FIG. 9A joined together.

FIG. 9B shows two of the boards 900 interlocked adjacent to each other.

Figure 10A:
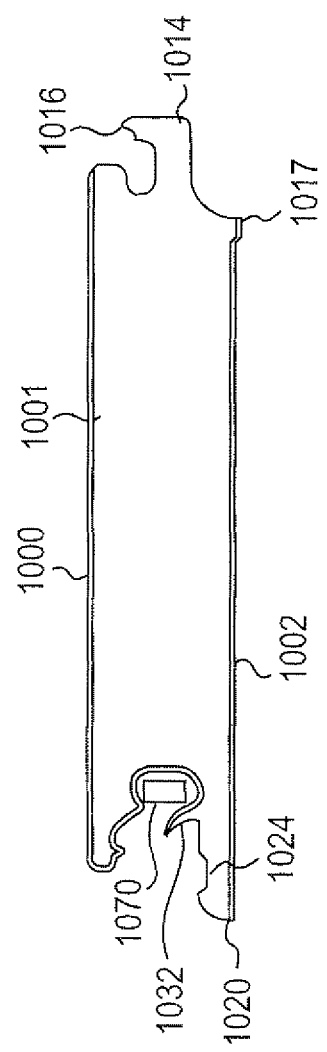
FIG. 10A is a cross-sectional view of another embodiment of a decking board.

FIG. 10A is a cross-sectional view of a board 1000 having a top cap coat 1001 and a lower cap coat 1002. A male side of the board 1014 includes an upwardly projecting bump 1016 and a lower pivot bump 1017. A female side 1020 of the board includes a projecting bump 1022 that can snap over and interlock with the projecting bump 1016, a flexible tap 1032, which can help hold the boards together in alignment, and accommodate for expansion of the boards, and a water drain channel 1024. Further, the female end has an open area to the inside of the flexible tab 1032 which can be sized and dimensioned to receive a heating wire or cable. FIG. 10A shows the heating element 1070 as having a generally vertical rectangular cross-section.

Figure 10B:
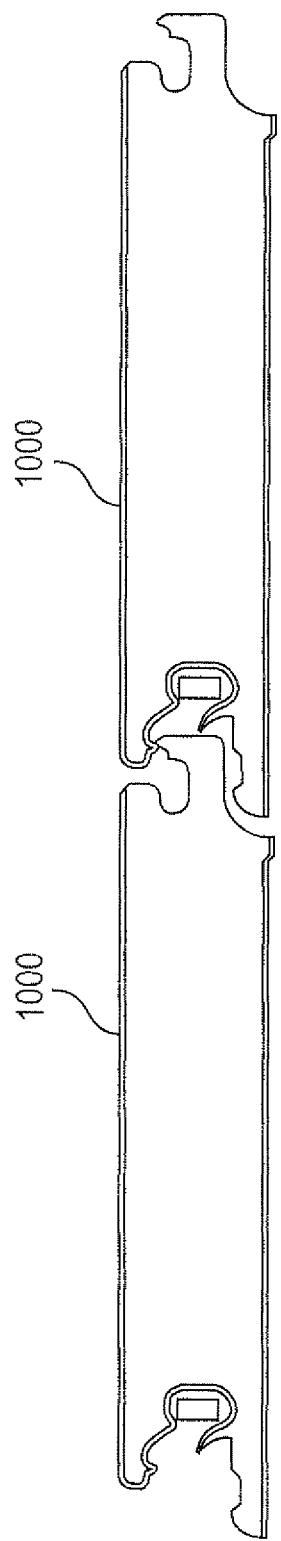
FIG. 10B shows two decking boards according to FIG. 10A joined together.

FIG. 10B shows two of the boards 1000 interlocked adjacent to each other. In this embodiment, the aperture on the female end is shaped more vertically, so that the heating element can be oriented more vertically.

Figure 11A:
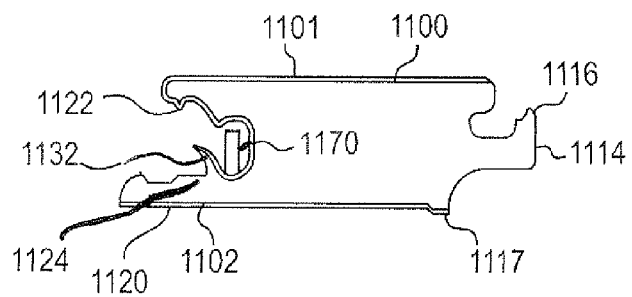
FIG. 11A is a cross-sectional view of another embodiment of a decking board.

FIG. 11A is a cross-sectional view of a board 1100 having a top cap coat 1101 and a lower cap coat 1102. A male side of the board 1114 includes an upwardly projecting bump 1116 and a lower pivot bump 1117. A female side 1120 of the board includes a projecting bump 1122 that can snap over and interlock with the projecting bump 1116, a flexible tab 1132, which can help hold the boards together in alignment, and accommodate for expansion of the boards, and a water drain channel 1124. Further, the female end has an open area to the inside of the flexible tab 1132 which can be sized and dimensioned to receive a heating wire or cable. FIG. 11A shows the heating element 1170 as having a generally vertical rectangular cross-section.

Figure 11B:
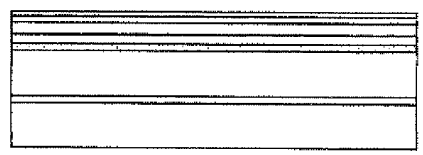
FIG. 11B is a side view of the board of FIG. 11A.
Figure 11C:
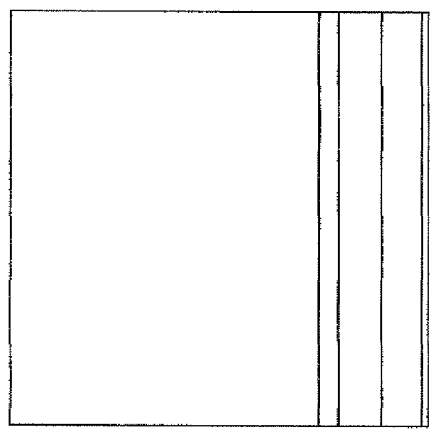
FIG. 11C is a bottom view of the board of FIG. 11A.
Figure 11D:
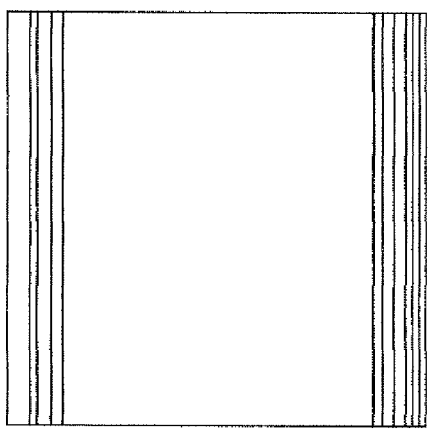
FIG. 11D is a top view of the board of FIG. 11A.
Figure 11E:
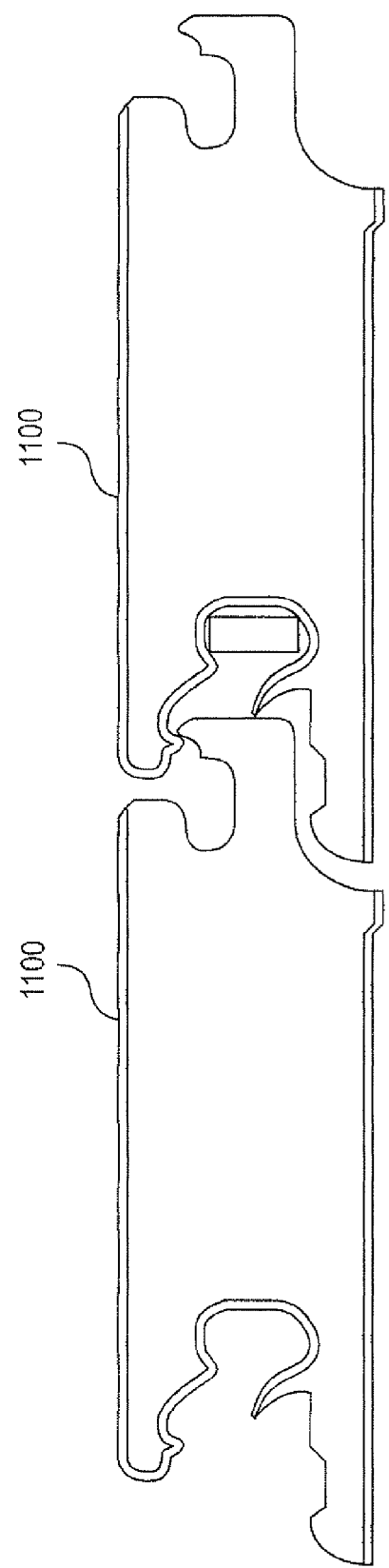
FIG. 11E is a cross-sectional view of two boards according to FIG. 11A mounted together.
Figure 12B:
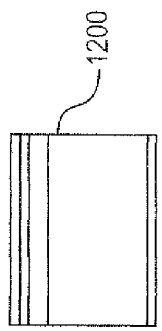
FIG. 12B is a side view of the dock board of FIG. 12A.
Figure 12A:
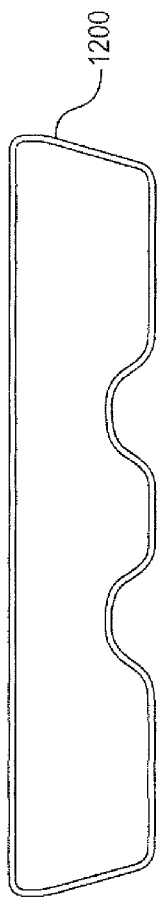
FIG. 12A is a cross-sectional view of another embodiment of a dock board.
Figure 12C:
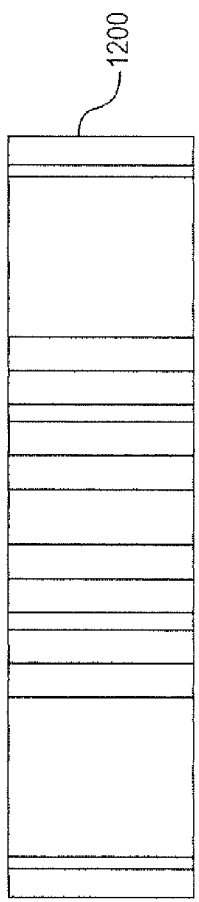
FIG. 12C is a bottom view of the dock board of FIG. 12A.
Figure 12D:
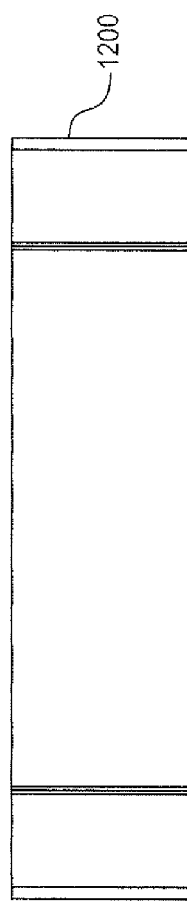
FIG. 12D is a top view of the dock board of FIG. 12A.

FIG. 11B shows two of the boards 1100 interlocked adjacent to each other.

The female sided of the boards of FIGS. 8A through 11D form a partially enclosed conduit for holding the heating element 870, 970, 1070, 1170, etc. When the boards are installed adjacent each other the male sides in some embodiments will substantially enclose the female-side conduit so the heating element is not exposed to water.

FIGS. 12A-12D show the cross-sectional and other views of a dock board 1200.

Although the various embodiments have been described in detail, it should be understand that the invention that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A decking board system comprising:
   at least a first decking board and a second decking board, each having a first longitudinal side and a second longitudinal side, wherein the first longitudinal side includes a top portion and a male projecting member that includes a first portion extending generally laterally defining an open channel portion configured to collect fluid between the decking boards and a second portion extending generally upward from the first portion;
   an upwardly directed rib portion integrally formed on the second portion substantially at an end of the second portion; wherein the second longitudinal side includes a top portion and a female slot defining a downwardly directed rib formed substantially at the end of the top portion, when the first decking board and second decking board are connected adjacent to each other, the top portion of the first longitudinal side of the first decking board and the top portion of the second longitudinal side of the second decking board define a gap therebetween configured to permit fluid to flow to the open channel and the upwardly directed rib contacts the downwardly directed rib and forms a frictional engagement therebetween.

2. The decking board system according to claim 1, wherein the second longitudinal side also has an upwardly directed channel configured to receive and direct liquid.

3. The decking board system according to claim 1, wherein the female slot further comprises:
a flexible member that biases against the first longitudinal side when the ribs are in virtual engagement.

4. The decking board system according to claim 3, wherein the flexible member is curved.

5. The decking board system according to claim 3, wherein the flexible member is upwardly directed.

6. The decking board system according to claim 4, wherein the flexible member is a resilient tab.

7. The decking board system according to claim 6, wherein the female slot defines a longitudinal partial conduit together with the resilient tab, and the longitudinal partial conduit is configured to receive a heating element.

8. A decking board system, comprising:
at least a first decking board and a second decking board, each of the decking boards having a first longitudinal side and a second longitudinal side, wherein the first longitudinal side includes an upper portion an intermediate portion including an open channel portion configured to collect fluid between the decking boards and a second portion having an integrally formed rib portion extending generally upward substantially at an end of the second portion the second longitudinal side has an upper portion and a laterally extending tongue defined by at least one downwardly directed rib member proximate to an one upwardly directed channel at a top portion and formed substantially at an end of the top portion, when the first decking board and second decking board are connected a gap is formed between the respective upper portions to permit fluid flow therethrough to the open channel portion.

9. The decking board system of claim 8, wherein said first longitudinal side further comprises:
a longitudinal notch adapted to receive said laterally extending tongue.

10. The decking board system of claim 8, wherein a groove adapted to receive a male projecting member comprises:
a flexible member adapted to contact said first longitudinal side.

11. The decking board system of claim 10, wherein the flexible member is breakable upon application of a predetermined side force.

12. The decking board system according to claim 8, wherein the main central body portion has at least one hollow region.

13. A decking board system, comprising:
at least a first decking board and a second decking board, each of the decking boards having a first longitudinal side and a second longitudinal side;
a first longitudinal side having an upper portion and lower portion and a first portion extending generally laterally, including a channel portion configured to collect fluid between the decking board and an associated decking board at least one upwardly directed male projecting member, the projecting member having an upwardly directed rib portion integrally formed thereon substantially at a non-centralized location on the projecting member;
a second longitudinal side having an upper portion and lower portion and a groove adapted to receive said male projecting member; and a laterally extending tongue; and
a main central body portion disposed between the longitudinal sides, wherein in a connected position the respective upper portions of the first decking board and second decking board define a gap, and the respective lower portions of the first decking board and second decking board define a gap therebetween.

14. The decking board system of claim 13, wherein said groove adapted to receive said male projecting member comprises:
a flexible member adapted to contact said first longitudinal side.

15. The decking board of system claim 14, wherein the flexible member is breakable upon application of a predetermined side force.

16. The decking board system according to claim 13, wherein the main central body portion has at least one hollow region.

17. The decking board system according to claim 16, further comprising;
a heating element disposed within the hollow region.

18. The decking board system according to claim 6, wherein the resilient tab is breakable upon application of a predetermined side force.

* * * * *